United States Patent
Fischer et al.

(10) Patent No.: US 10,280,992 B2
(45) Date of Patent: May 7, 2019

(54) DISC BRAKE FOR A UTILITY VEHICLE

(71) Applicant: KNORR-BREMSE Systeme fuer Nutzfahrzeuge GmbH, Munich (DE)

(72) Inventors: Rudolf Fischer, Erding (DE); Rudolf Kielbasa, Karlsfeld (DE); Peter Balint, Aidlingen (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 25 days.

(21) Appl. No.: 15/581,893

(22) Filed: Apr. 28, 2017

(65) Prior Publication Data

US 2017/0234378 A1 Aug. 17, 2017

Related U.S. Application Data

(63) Continuation of application No. PCT/EP2015/073465, filed on Oct. 9, 2015.

(30) Foreign Application Priority Data

Oct. 30, 2014 (DE) ........................ 10 2014 115 765

(51) Int. Cl.
*F16D 55/2265* (2006.01)
*F16D 55/227* (2006.01)
*F16D 65/00* (2006.01)

(52) U.S. Cl.
CPC ..... *F16D 55/22655* (2013.01); *F16D 55/227* (2013.01); *F16D 55/2265* (2013.01); *F16D 65/0068* (2013.01); *F16D 2200/0026* (2013.01)

(58) Field of Classification Search
CPC ........... F16D 55/2265; F16D 55/22655; F16D 55/227; F16D 65/0068; F16D 2200/0026

(Continued)

(56) References Cited

U.S. PATENT DOCUMENTS 4,331,221 A * 5/1982 Evans ............... F16D 55/22655
188/73.31
4,392,560 A * 7/1983 Nakasu ............. F16D 55/22655
188/73.34

(Continued)

FOREIGN PATENT DOCUMENTS

DE 27 23 922 A1 12/1977
DE 33 31 665 A1 3/1985

(Continued)

OTHER PUBLICATIONS

International Search Report (PCT/ISA/210) issued in PCT Application No. PCT/EP2015/073465 dated Feb. 12, 2016 with English translation (five pages).

(Continued)

*Primary Examiner* — Thomas W Irvin

(74) *Attorney, Agent, or Firm* — Crowell & Moring LLP

(57) ABSTRACT

A disc brake for a commercial vehicle includes a caliper that straddles a brake disc and is retained on a stationary brake carrier in such a way as to be axially movable in relation to the brake disc on two guide bars connected to the brake carrier. The guide bars are each guided in a sliding bearing that is non-movably retained in a bore of the caliper. The disc brake is designed such that at least one of the sliding bearings is made up of at least two metal sleeves, which rest against the guide bar and are located at a distance from one another in the axial direction, and at least one spacing sleeve located there between.

16 Claims, 3 Drawing Sheets

(58) Field of Classification Search
USPC .......................................... 188/73.45, 73.44
See application file for complete search history.

(56) References Cited

U.S. PATENT DOCUMENTS

| | | | | |
|---|---|---|---|---|
| 4,458,790 | A | * | 7/1984 | Hoffman, Jr. ....... F16D 65/0979 188/196 P |
| 4,537,288 | A | * | 8/1985 | Stoka ...................... F16D 65/54 188/196 P |
| 4,781,273 | A | * | 11/1988 | Fujinami .................. B61H 5/00 188/73.42 |
| 5,439,084 | A | * | 8/1995 | Vila Boluda ......... F16B 33/002 188/73.44 |
| 5,730,258 | A | | 3/1998 | Evans |
| 8,220,596 | B2 | * | 7/2012 | Fischer ................ F16D 55/227 188/73.44 |
| 8,944,221 | B2 | * | 2/2015 | Pericevic .......... F16D 55/22655 188/67 |
| 9,816,577 | B2 | * | 11/2017 | Fischer ................. F16F 1/3835 |
| 2009/0260928 | A1 | * | 10/2009 | Baumgartner .... F16D 55/22655 188/73.44 |
| 2010/0000828 | A1 | | 1/2010 | Pericevic et al. |

FOREIGN PATENT DOCUMENTS

| | | | |
|---|---|---|---|
| DE | 10 2007 001 213 A1 | | 7/2008 |
| DE | 10 2014 106533 A1 | * | 11/2015 ....... F16D 55/22655 |
| GB | 1 577 945 | | 10/1980 |

OTHER PUBLICATIONS

German-language Written Opinion (PCT/ISA/237) issued in PCT Application No. PCT/EP2015/073465 dated Feb. 12, 2016 (four pages).

* cited by examiner

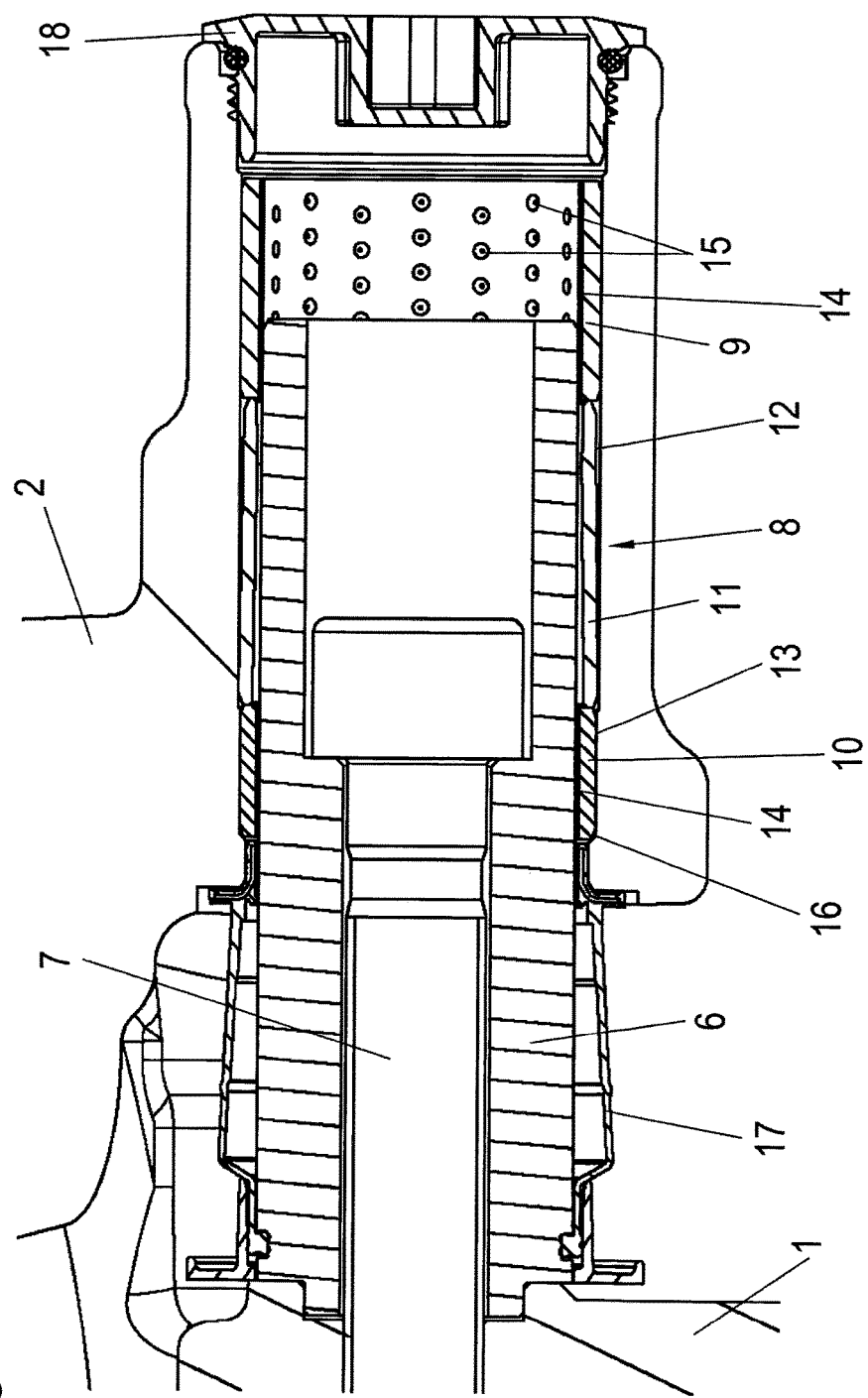

DISC BRAKE FOR A UTILITY VEHICLE

CROSS REFERENCE TO RELATED APPLICATIONS

This application is a continuation of PCT International Application No. PCT/EP2015/073465, filed Oct. 9, 2015, which claims priority under 35 U.S.C. § 119 from German Patent Application No. 10 2014 115 765.6, filed Oct. 30, 2014, the entire disclosures of which are herein expressly incorporated by reference.

BACKGROUND AND SUMMARY OF THE INVENTION

The invention relates to a disc brake for a commercial vehicle having a brake caliper straddling a brake disc. The caliper is mounted so as to be axially displaceable in relation to the brake disc on a stationary brake carrier on two guide bars that are connected to the brake carrier, wherein the guide bars are each guided in a sliding bearing that is non-displaceably held in a bore of the brake caliper.

In the case of such a disc brake, which is also referred to as a "sliding-caliper" disc brake, the brake caliper is connected to a brake carrier on the vehicle side by fastening elements.

To this end, guide bars are connected to the brake carrier for example by screwing, which on the other side are guided in sliding bearings of the brake caliper so that in relation to a brake disc that is non-rotationally held on an axle of the vehicle, an axial displacement of the brake caliper in relation to the brake carrier that is fixed in place is possible.

One of the sliding bearings is designed as fixed bearing with little sliding play and substantially serves for axially guiding the brake caliper, wherein the bearing play is kept as small as possible.

The other sliding bearing, by contrast, forms a loose bearing and, due to its function, has a greater bearing play since, in addition to the axial guidance, tolerance compensation and thermally-induced expansions also have to be taken into account.

As the sliding bearing of the fixed bearing, a metal sleeve is used which, in a manner secured against displacement, is held frictionally engaged in a bore of the brake caliper.

The metal sleeve consists here of a non-ferrous metal, for example brass or bronze, or a composite material, with an outer shell of steel plate and an inner shell, which forms the guiding surface for the guide bar, of a sliding bearing-typical non-ferrous metal, which is connected to the outer shell for example by sintering.

For a lasting operational readiness, a plurality of dimples for receiving lubricants is additionally introduced into the inner surface, i.e. the guiding surface of the sliding bearing.

Altogether, the sliding bearing can only be realized with a substantial expenditure of material and production, with the high costs resulting from this, which are opposed to the constant demands for cost minimization.

The invention is based on the object of further developing a disc brake of the generic type so that it can be more cost-effectively produced with unrestricted functional reliability.

This object is solved by a disc brake for a commercial vehicle having a brake caliper straddling a brake disc. The caliper is mounted so as to be axially displaceable in relation to the brake disc on a stationary brake carrier on two guide bars that are connected to the brake carrier, wherein the guide bars are each guided in a sliding bearing that is non-displaceably held in a bore of the brake caliper. At least one of the sliding bearings is formed of at least two metal sleeves which are arranged spaced from one another in the axial direction and lie against the guide bar, and at least one spacer sleeve positioned between them.

Through the invention, the material proportion of the sliding bearing assuming the guidance in relation to the guide bar is significantly reduced, as a result of which a substantial cost saving materializes since, as described with respect to the prior art, the material provided for the guidance is relatively high in its procurement costs.

The width of the at least two metal sleeves according to the invention is adapted to the displacement path of the brake caliper, even with worn brake pads, in such a manner that even in a position of the brake caliper that is maximally displaced in relation to the guide bar an adequate guidance of the guide bar is ensured.

To this end, with simultaneously optimizing the use of material, the metal sleeve facing the brake carrier is, as provided according to a further aspect of the invention, shorter than the metal sleeve located opposite and defining the end region of the sliding bearing.

The same is dimensioned so that, as mentioned, the brake caliper still ensures an adequate guidance of the brake caliper on the guide bar even in the case of a maximal displacement, i.e. in the case of the complete permissible wear of the brake pad.

The spacer sleeve keeping the distance between the two metal sleeves can be produced from a more cost-effective material than the metal sleeves. An appropriate material is, for example, a plastic with sufficient intrinsic stiffness that compression in the axial direction is not possible.

Since the spacer sleeve exclusively has to fulfill the task of maintaining a distance, no diameter tolerances have to be essentially maintained, wherein the spacer sleeve can also be positioned with play in relation to the guide bar.

Obviously, it is also possible to produce the spacer sleeve from metal instead of a suitable plastic, for example a cost-effective steel plate or as a section of a tube.

In a further development according to the invention, the bore of the brake caliper receiving the sliding bearing is formed as a stepped bore with a smaller diameter on the region facing the brake carrier, wherein this region, in its depth, corresponds approximately to the length of the inserted shorter metal sleeve, which in its outer diameter is matched to the clear diameter of the region of the bore with the smaller diameter so that a press fit materializes.

The metal sleeve located opposite accordingly is so much larger in its outer diameter that sliding into the region with the smaller diameter is prevented.

It is thereby ensured that the sliding bearing during the assembly is always inserted into the bore correctly, i.e. on the correct side, so that a malfunctioning by placing the shorter metal sleeve in the region is excluded, which is to ensure a guidance in relation to the guide bar even in a maximal displacement position of the brake caliper.

The assembly of the sliding bearing as a whole is effected in such a manner that the two metal sleeves and the spacer sleeve positioned between them are placed onto an insertion tool, for example a mandrel, with which the sliding bearing is then inserted into the bore, the shorter metal sleeve upfront.

The shorter metal sleeve in the inserted end position lies against a constriction of the bore which serves as stop for the sliding bearing as a whole, wherein the metal sleeve on its face end facing away from the spacer sleeve comprises a circumferential introduction bevel in the outer shell region, preferentially in the form of a chamfer, so that sliding into the bore with the smaller diameter is possible without problem.

Instead of the mentioned chamfer on the shorter metal sleeve as the insertion aid, the bore with the smaller diameter can obviously also be suitably configured in the region of the stepping.

The invention described in relation to the fixed bearing can obviously be employed also with the other sliding bearing, the loose bearing, if applicable subject to suitably modifying the metal sleeves and/or the spacer sleeve in order to take into account the functions that are different in relation to a fixed bearing.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 3 is a part longitudinal section through an inventive disc brake according to the line II-II in FIG. 1 in various operating positions and showing the inventive sliding bearing.

DETAILED DESCRIPTION OF THE DRAWINGS

Figure 1:
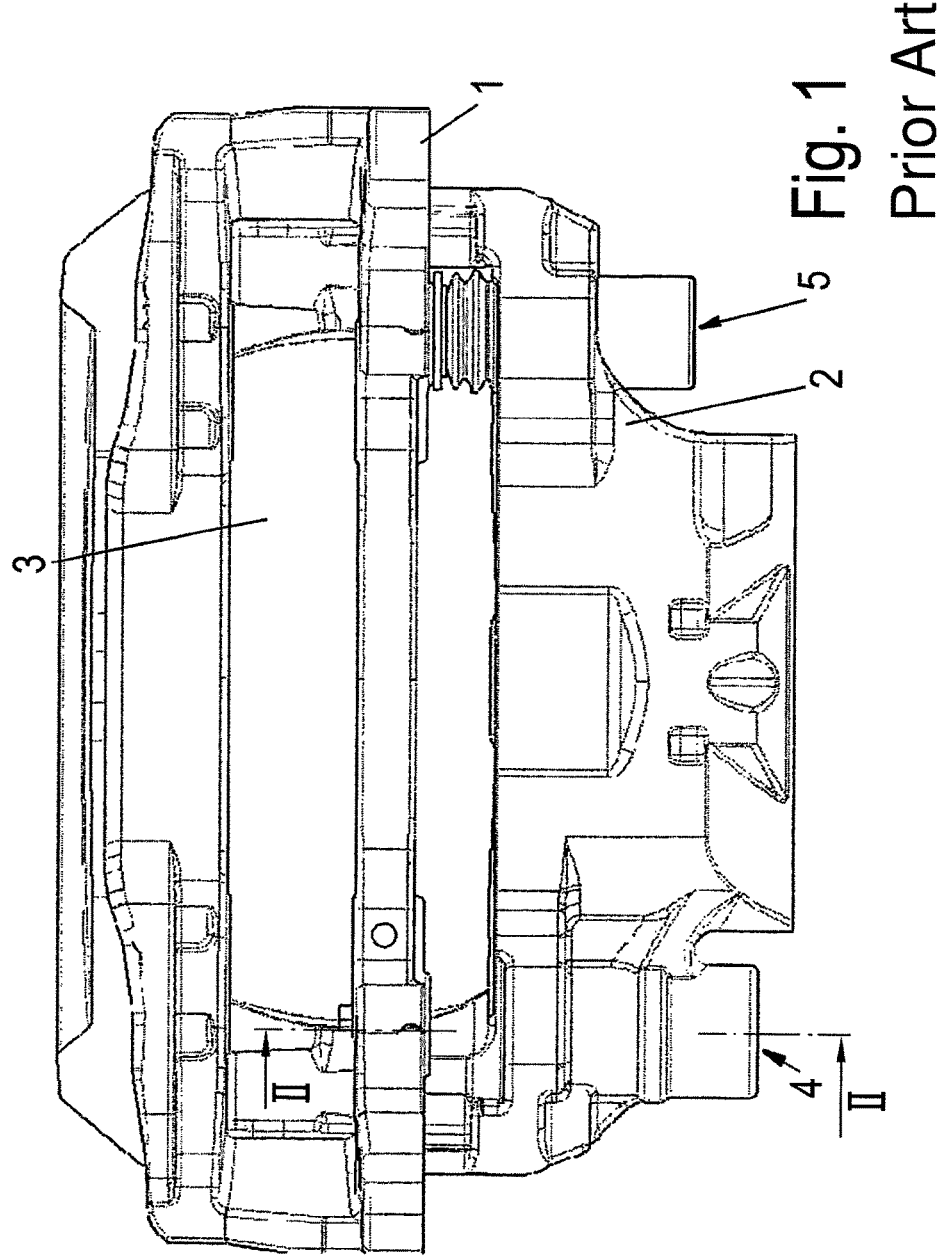
FIG. 1 is a schematic top view a disc brake according to the prior art.

In FIG. 1, a disc brake for a commercial vehicle according to the prior art is shown, which in its basic construction includes a brake caliper 2 which straddles a brake disc 3. The brake disc 3 is non-rotationally fastened on an axle of the vehicle (not shown).

Figure 2:
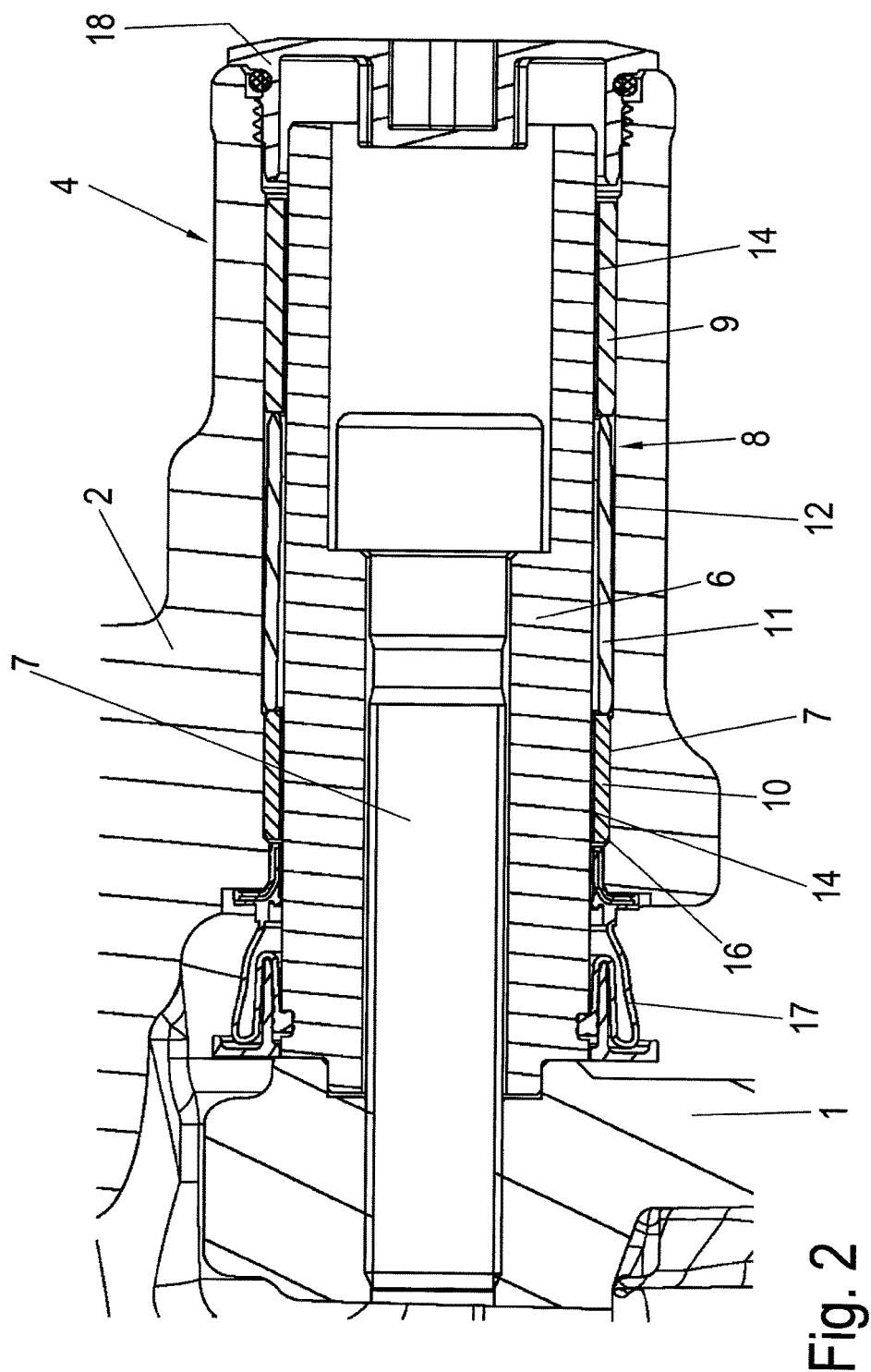
FIG. 2 is a part longitudinal section through an inventive disc brake according to the line II-II in FIG. 1 in various operating positions and showing the inventive sliding bearing.

The brake caliper 2 is arranged on a brake carrier 1 so as to be axially displaceable in relation to the brake disc 3. To this end, two fastening elements are provided, each of which has a guide bar 6 that is connected to the brake carrier 1 in a fixed manner and which is fastened to the brake carrier 1 by way of a screw 7 (FIG. 2). One fastening element is designed as loose bearing 5 and the other one as a fixed bearing 4, wherein the latter according to the invention is depicted in detail in the FIGS. 2 and 3.

For mounting the guide bar 6, i.e. for axially guiding the brake caliper 2, the fixed bearing 4 has a sliding bearing 8, which according to the invention is formed of at least two metal sleeves 9, 10 which are arranged spaced from one another in the axial direction and at least one spacer sleeve 11 positioned therebetween, on the face ends of which one of the metal sleeves 9, 10 supports itself in each case. In the example, the two metal sleeves 9, 10 form the respective end regions of the sliding bearing 8.

The metal sleeves 9, 10 consist of a substrate forming the outer shell, preferentially of steel and a layer forming an inner shell 14 fastened thereon of a material that is particularly suitable for the sliding bearing function, in particular a non-ferrous metal. For minimizing the sliding friction, grease dimples 15 for depositing lubricating grease are provided on the side of the inner shell 14 facing the guide bar 6 on which side the guide bar 6 supports itself, as is very clearly noticeable in FIG. 3.

The sliding bearing 8 is inserted into a bore 12 of the brake caliper 1 and held there at least in the region of the metal sleeves 9, 10 secured against displacement in a frictionally engaged manner.

This bore 12 is designed as stepped bore with a portion 13 with smaller diameter, which receives the metal sleeve 10 facing the brake carrier 1.

In its outer diameter and in its length, this metal sleeve 10 in each case is smaller than the second metal sleeve 9, which is arranged located opposite, wherein the bore 12 in this region is closed off by a cap 18 which is held in a force-fitted manner.

As a centering and inserting aid, the shorter metal sleeve 10, i.e. the metal sleeve facing the brake carrier 1, has a chamfer 16 in the outer edge region on the side facing away from the spacer sleeve 11.

In this region, a bellows 17 is fastened in the brake caliper which on the other side, is held on the guide bar 6. The bellows 17, as a seal, covers the shell surface of the guide bar 6 that is freely exposed in relation to the surroundings between the brake carrier 1 and the brake caliper 2.

While FIG. 2 shows a position of the brake caliper 2 on the guide bar 6 as presents itself with an unused brake pad, FIG. 3 represents a position in which the brake pad or its friction pad is largely worn off, wherein the brake caliper 2 is then pushed away relative to the brake carrier 1 as is typical for a sliding-caliper disc brake.

In FIG. 3 it is clearly noticeable that the longer metal sleeve 9 forms a guiding surface for the guide bar 6 that is adequate even in this position.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for use with a brake disc in a commercial vehicle, comprising:
    a brake caliper configured to straddle the brake disc;
    a stationary brake carrier;
    two guide bars connected to the brake carrier, the caliper being mounted so as to be axially displaceable in relation to the brake disc on the two guide bars;
    two sliding bearings non-displaceably held in respective bores of the brake caliper, wherein the two guide bars are each respectively guided in the respective sliding bearings,
    wherein
        at least one of the two sliding bearings is formed of at least two metal sleeves and at least one spacer sleeve, and
        the two metal sleeves are arranged spaced apart from one another in an axial direction and rest against the guide bar, and the spacer sleeve is positioned between and in contact with the two metal sleeves such that the two metal sleeves are separated by a fixed distance during brake operation.

2. The disc brake according to claim 1, wherein the spacer sleeve is made of metal or plastic.

3. The disc brake according to claim 2, wherein the spacer sleeve is formed from a section of a tube.

4. The disc brake according to claim 2, wherein the spacer sleeve wraps the guide bar with minimal play.

5. The disc brake according to claim 1, wherein the spacer sleeve is formed from a section of a tube.

6. The disc brake according to claim 1, wherein the spacer sleeve wraps the guide bar with minimal play.

7. The disc brake according to claim 1, wherein at least one of the bores is formed as a stepped bore with a diameter that is smaller in a portion which is provided on a side of the bore facing the brake carrier.

8. The disc brake according to claim 7, wherein the metal sleeve mounted in the smaller portion has a shorter axial length than the metal sleeve located opposite which has a longer axial length.

9. The disc brake according to claim 8, wherein an outer diameter of the metal sleeve with the longer axial length is greater than a diameter of the smaller portion.

10. The disc brake according to claim 8, wherein the spacer sleeve is formed of a material which is dimensionally stable in the axial direction.

11. The disc brake according to claim 10, wherein the two metal sleeves rest against the spacer sleeve at the respective face ends.

12. The disc brake according to claim 8, wherein the axial length of the shorter metal sleeve approximately corresponds to the length of the smaller portion.

13. The disc brake according to claim 8, wherein the shorter metal sleeve on its side facing the brake carrier is provided with a chamfer in an outer edge region.

14. The disc brake according to claim 8, wherein the longer metal sleeve, which is arranged in an end region of the bore facing the brake carrier, covers the guide bar with sliding contact at least in certain regions in any operating position of the disc brake.

15. The disc brake according to claim 1, wherein the spacer sleeve is formed of a material which is dimensionally stable in the axial direction.

16. The disc brake according to claim 1, wherein the two metal sleeves rest against the spacer sleeve at the respective face ends.

* * * * *